Feb. 20, 1923.

J. W. FAY.
ELECTRIC ARC WELDING MACHINE.
FILED MAR. 25, 1920.

Witnesses:

Inventor:
JOSEPH W. FAY
By Andrews & Lundell
Attys.

Feb. 20, 1923.

J. W. FAY.
ELECTRIC ARC WELDING MACHINE.
FILED MAR. 25, 1920.

Witness:
U. K. Olson

Inventor:
JOSEPH W. FAY
by Andrews & Lundell
Attys.

Patented Feb. 20, 1923.

1,446,170

UNITED STATES PATENT OFFICE.

JOSEPH W. FAY, OF MILWAUKEE, WISCONSIN, ASSIGNOR TO SEAMWELD EQUIPMENT COMPANY, A CORPORATION OF WISCONSIN.

ELECTRIC-ARC-WELDING MACHINE.

Application filed March 25, 1920. Serial No. 368,781.

*To all whom it may concern:*

Be it known that I, JOSEPH W. FAY, a citizen of the United States, residing at Milwaukee, in the county of Milwaukee and State of Wisconsin, have invented certain new and useful Improvements in Electric-Arc-Welding Machines, of which the following is a specification.

This invention relates to electric arc welding machines. One of the objects of the invention is to provide apparatus whereby two welding arcs may be operated in welding a joint or seam, one of the arcs being used for welding one portion of the seam, and the other for welding the remaining portion. A further object of the invention is to produce suitable apparatus for carrying on each of the welding processes, and particularly for carrying on the two welding processes more or less independently of each other, or either simultaneously or successively, as the conditions of the particular case may require. Another object is to provide automatic means for welding seams which are irregular in shape. Other objects of the invention will be apparent from a consideration of the accompanying drawings and the following description thereof.

Of the accompanying drawings Fig. 2 is an end elevation of the machine.

It is frequently desired to weld long joints or seams, and in order to expedite the work and to facilitate the welding operation, because of certain conditions that may exist it is advantageous to have a double arc machine which has provision for operating the two arcs with the same general mechanism, or two separate machines may be used. In either case the arrangement is such that each arc is in a system of its own more or less independent of the system of the other arc, so that if either arc goes out the other will not be affected, and so either arc can be moved and manipulated in general independently of the other, but so arranged that when properly adjusted the same driving means will automatically operate both arcs simultaneously or successively, and so a single operator can conveniently and efficiently carry on the double welding process.

The machine which I prefer for the purpose comprises a framework 10 supported by legs 11, which, in general, forms a long narrow table upon which the various elements of the welding mechanism are mounted. In the rear of the table is mounted longitudinally a lead screw 12 which is the main driving shaft of the machine, and which is continuously rotated by any suitable means such as an electric motor 13 and suitable speed reducing mechanism connecting the shaft 14 of the motor and the shaft 12. It is to be understood, however, that the shaft 12 may be operated by an overhead shaft or by any other suitable means. Mounted longitudinally with the table and on the rear side thereof, is a beam 15 which is fixed rigidly to the table by means of end brackets 16 and which forms the main guiding and controlling means of the machine. This beam has on its lower edge a toothed rack 17; and the beam, for convenience hereinafter, will be called the main rack of the machine, as the rack 17 is used in operating various portions of the mechanism of the machine, and the beam itself is used as a guide for substantially all of the horizontally sliding mechanism.

The machine also comprises means for suitably holding the article to be welded, hereinafter called the work; and also means for suitably operating, both horizontally and vertically, the welding electrodes. In this particular instance I have shown means for holding the work stationary, while the electrodes are to be moved horizontally along the seam to be welded. It is to be understood, however, that my invention is not necessarily limited to such an arrangement, as the work to be welded may be moved while the welding electrodes are moved only vertically, it being necessary, so far as the general application of the invention is concerned merely to have relative movement of the electrodes and the work to be welded.

Although I have illustrated and described herein an arc welding machine using metal electrodes, yet it is to be understood that arcs with other types of electrodes may be used. The machine may be used for welding seams and joints of pipes, sheets, or other articles. For the purpose of illustrating the invention I have shown herein the machine as applied to the welding of a seam on a housing. In welding the seam to be welded is mounted parallel with the path of motion of the arcs, and the two arcs can be operated from each end of the seam to be welded, each arc working towards the center of the seam, or both arcs may be started successively or simultaneously near the center and operated in opposite directions, or one arc may be started near the center and the other on one end of the seam, and both arcs operated in the same direction. In this instance I have shown the mechanism arranged for operating the electrodes in opposite directions, starting from near the central portion of the seam to be welded.

As is well understood, in order to carry on electric welding of seams it is usual to manipulate the seam or the electrode, so as to produce relative longitudinal movement by means of mechanism operated manually; and even though the work in general is carried on automatically this manual manipulation is necessary in order to properly start the welding process. I have therefore provided means for such hand operation, and it is to be understood that the mechanism provided substantially is duplicate for the two electrodes, although for convenience I shall describe the mechanism as applied to a single electrode.

Figure 5:
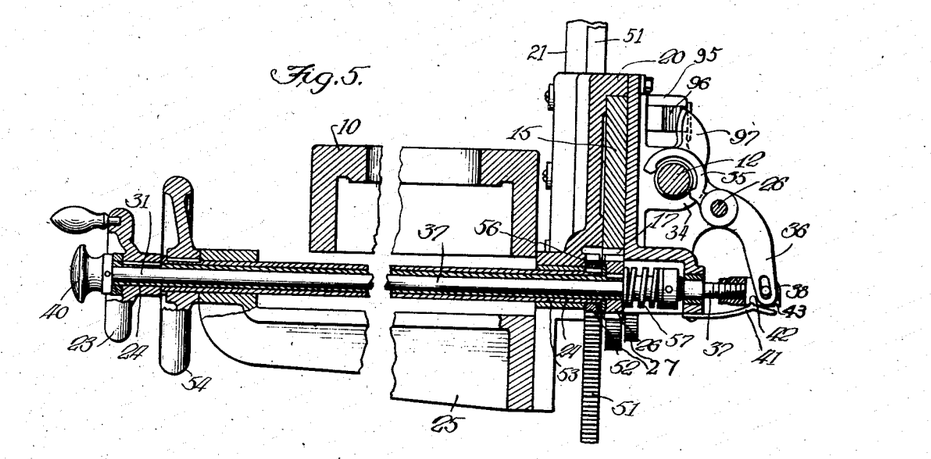
Figure 6:
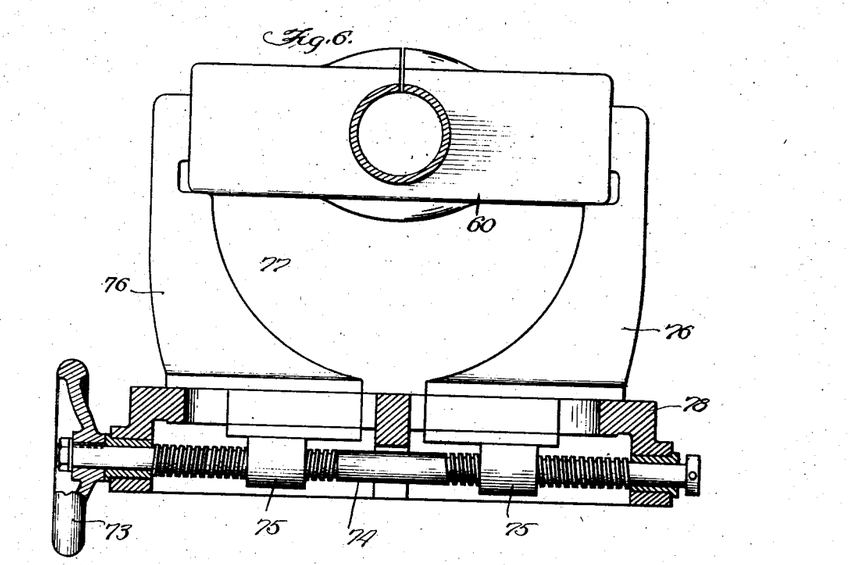

In order to move the electrode horizontally, or longitudinally of the frame of the machine, I provide a carriage 20 which is slidably mounted upon the main rack 15. Fixed to this carriage is a standard 21 which supports, in a manner hereinafter described, the electrode 22. Horizontal movement of the electrode is therefore produced by sliding the carriage 20 along the beam 15. This horizontal movement of the electrode is manually produced by means of the hand wheel 23 which is fixed to a tube 24. The tube 24 is rotatably mounted in a bracket 25 which is fixed to the carriage 20. The outer end of the tube 24 is journaled in the outer end of the bracket 25, and the inner end of the tube is journaled in the carriage 20, as is shown in Fig. 5. Fixed to the inner end of the tube 24 is a spur gear 26 which, by means of the change gearing 27, is operatively connected with the rack 17 of the beam 15. In view of this system of gearing, and inasmuch as the beam 15 is stationary and the carriage 20, together with the bracket 25, is slidably mounted thereon, it is evident that as the hand wheel 23 is rotated in one direction or the other the carriage, together with the bracket 25 and the hand wheel itself and also the electrode 22 will be moved horizontally, or longitudinally with reference to the machine, and hence longitudinally with reference to the seam to be welded; as the seam is mounted, in a manner hereinafter described, parallel with the main rack 15. By rotating either hand wheel 23 clockwise the corresponding carriage will be moved to the left.

In order to automatically move the electrodes horizontally I provide the following means: The lead screw 12 is continuously operated by means of the electric motor 13 which is operatively connected with the lead screw in any suitable manner such as by means of the worm gears 32 and 33. Fixed to the carriage 20 is a bracket 34 in which the lead screw 12 is journaled; and pivoted to this bracket is a half nut 35. By means of the arm 36 fixed to the nut, the threads of the nut may be forced into mesh with the threads of the lead screw; and, in such a case, it is evident that, as the lead screw rotates, the nut 35 together with the carriage will be moved horizontally along the main rack 15.

In order to control the horizontal operation of the carriage 20 by means of the nut 35, I provide a rod 37 having a head 38 fixed to the rear end of the rod and pivoted to the arm 36. The rod 37 is slidably mounted in the carriage 20 and the bracket 25, passing through the tube 24 and projecting therefrom in front of the hand wheel 23; and fixed to the projecting end of the rod 37 is a hand button 40. By means of the button 40 the rod, together with the arm 36, may be forced forwardly or backwardly, thus releasing or locking the nut 35 with reference to the lead screw 12. Hence, when it is desired to automatically operate the electrode horizontally, the button 40 is pushed inwardly, so as to lock the split nut to the lead screw 12; and when it is desired to stop the operation of the electrode the button 40 is pulled outwardly, thus unlocking the split nut. A spring 41 having a projection 42 adapted to pass into depressions 43 in the head 38, holds the nut 35 in its adjusted positions, either locked or unlocked.

It is to be understood that, as the carriage 20, together with the electrode 22, is moved horizontally by means of the motor 13, or by any other suitable driving means, if the welding process has been properly started, the welding of the seam will continue automatically, provided the electrode is being properly fed to the weld as it is being consumed. It therefore becomes desirable to provide means for automatically feeding the electrode to the weld at a suitable rate, depending upon the rate of horizontal movement of the electrode and various other conditions. The means which I have provided for properly feeding the electrode to the weld comprises means for moving the electrode vertically, and includes means for properly adjusting manually the vertical position of the electrode in starting the welding process.

The electrode 22 is supported by its upper end by any suitable clamp. I have shown herein for the purpose of illustration a screw clamp 45 which is supported by a bracket 46, the lower end of the electrode passing through an insulation piece 47 supported by a bracket 50. The bracket 50 is fixed to the standard 21 at such an elevation as to suitably hold the lower end of the electrode during the welding process. The bracket 46 is fixed to a toothed rack 51 which is slidably mounted on the standard 21, so that as the rack 51 is moved vertically the electrode 22 will be moved accordingly. The rack 51 extends downwardly through the carriage 20, and meshes with a spur wheel 52, which is fixed to a tube 53, which encircles the tube 24, and forms a journal therefor. The rear end of the tube 53 is journaled in the carriage 20, and the forward end is journaled in the forward end of the bracket 25. Fixed to the forward end of the tube 53 is a hand wheel 54. It will be apparent from a consideration of this mechanism that when the hand wheel 54 is operated the gear wheel 52 will move vertically the rack 51, and hence the electrode 22; so that the electrode may be properly placed with reference to the seam to be welded in starting the welding process, and, if desired, the electrode then may be fed to the seam by means of the hand wheel 54, as the welding process continues.

However, I provide automatic means for feeding the electrode to the seam, which comprises the following: Friction disks 56 are rotatably mounted between the spur gears 26 and 52, and, by means of a spring 57, the pressure of the spur gears against the disks 56 is adjusted; so that, normally, when one of the spur gears is operated, the other will be operated by means of the friction of the disks. Hence when the carriage is moved horizontally by the lead screw 12, thus operating, by means of the stationary rack 17 the change gearing 27, the gear wheel 52 then will be rotated by means of the friction disks 56, and this will cause vertical operation of the rack 51 and the electrode 22. And the arrangement of the parts is such that, when the electrode is being moved horizontally by the lead screw 12, and the welding process is going on, the vertical movement of the electrode, by means of the gear 52, will be such as to feed the electrode downwardly to the seam, and the rate of feed will normally be such as is required to meet the various existing conditions.

Although, by the use of the friction disk 56 in the manner described, operation of one of the spur gears 26 or 52 normally will produce automatic operation of the other; and the operation of these gears will produce, as described, both horizontal and vertical movement of the electrode; yet the friction due to the disks may be overcome by means of either of the hand wheels 23 or 54; so that, if the movement of one of the electrodes vertically is not at such a rate as to meet the needs of the horizontal movement, the operator of the machine, by means of the corresponding hand wheel 54, may vary the vertical movement of the electrode to meet the needs, either temporarily or during the entire welding process. It being understood, however, that mere temporary adjustment of such feed is ordinarily all that is necessary. Also it is, of course, evident that proper adjustments of the vertical positions of the electrodes may be made in starting the welding operation by means of the hand wheels 54 overcoming the friction between the two spur gears 26 and 52. At the same time it is to be understood that the hand wheels will move horizontally with the carriages, as the welding process proceeds, and also that they will all continuously rotate during such process.

Further, as hereinabove stated, all the mechanism hereinabove described with reference to one of the electrodes is substantially duplicated with reference to the other. The arrangement of the parts, however, and the threads of the lead screw, being arranged so as to produce proper movement of the electrodes when acting together. In this instance the lead screw has a right hand thread for one of the electrode carriages, and a left hand thread for the other electrode carriage, so that the movement of the carriages will be in opposite directions. Also it should be understood that so far as the general principle of my invention is concerned each of the electrodes may be operated automatically by entirely independent driving means, each operating its own lead screw. And also two single arc machines may be connected up to the same work and arranged to cooperate substantially as if one machine with two arcs were used.

My machine may be used for welding various articles, particularly those having long joints or seams to be welded, such as tubes, sheets, or housings. In this instance I have shown the machine as welding a seam on a housing 60, which is fixed to the frame of the machine by suitable clamps 61, so that the seam to be welded is upward and parallel with the main beam 15. As many clamps as may be desired may be used, and the clamps may be of any suitable form. I prefer for the purpose a clamp having two jaws 62 and 63; the jaw 62 being fixed to the frame by means of the standard 64, and the jaw 63 being pivoted to the standard. An arm 65, fixed to the jaw 63, is operated by means of an arm 66 (Fig. 1) and in the following manner: The arm 66 is fixed to a rod 67, which is rotatably mounted in the frame 10 of the machine; and fixed to the rear end of the rod 67 is an eccentric 70, which, by means of the band 71 and the connecting members 72, operates the arm 65 when the lever 66 is operated. If it is desired to open the jaws, the lever 66 is raised, thus forcing upwardly the arm 65; and when the article to be welded is placed between the jaws 62 and 63 it is clamped in position by forcing the arm 66 downwardly.

A main clamp 77 also may be used, and is operated by means of the hand wheel 73 which is fixed to a right and left hand threaded rod 74, the respective threads being threaded into lugs 75, which are fixed to the respective jaws 76 of the clamp; the jaws being slidably mounted in the member 78 fixed to the frame of the machine. When the hand wheel 73 is operated, the jaws 76 will be opened or closed, as the case may be, and the housing 60 may be thus firmly held thereby.

The electric system for carrying on the welding process may be of any suitable type. I prefer for the purpose the systems shown diagrammatically in Fig. 1, which comprises an independent circuit for each arc. Each of the circuits comprises reactance coils 80. One terminal of the coils is grounded to the machine by means of the wire 81, and the other terminal is connected to the main line switch 83 by means of the wire 82, the switch being suitably connected to any suitable source of electric energy supply by means of the wires 88. The other terminal of the switch 83 is connected to the terminal 87 of the electrode by means of a wire 86, this terminal being mounted in, but insulated from, the bracket 46, and being electrically connected with the clamp 45 which is also insulated from the bracket. As each of the switches 83 is connected to the source of supply of electric energy, the two arc circuits are entirely independent of each other. Any ordinary electric system may be used for operating the motor 13.

I also provide means for automatically stopping the welding process when the weld is completed, which comprises mechanism for opening the main line switches, and also for unlocking the split nuts 35 from the lead screw. Each of the switch opening mechanisms comprises a member 90 fixed to the carriage 20, and arranged so that at the proper time it will come in contact with the handle 91 of the corresponding switch, and force the switch open. The means which I provide for unlocking the split nut comprise a member 95 fixed to the main rack 15, and positioned so that at the proper time a cam 96 will come in contact with the lug 97, fixed to the nut, and will force the nut away from the lead screw. And it is to be understood that each of the members 90 and 95 may be adjusted to the proper positions for performing its function at the proper time.

Figures 7, 8, 9, 10:
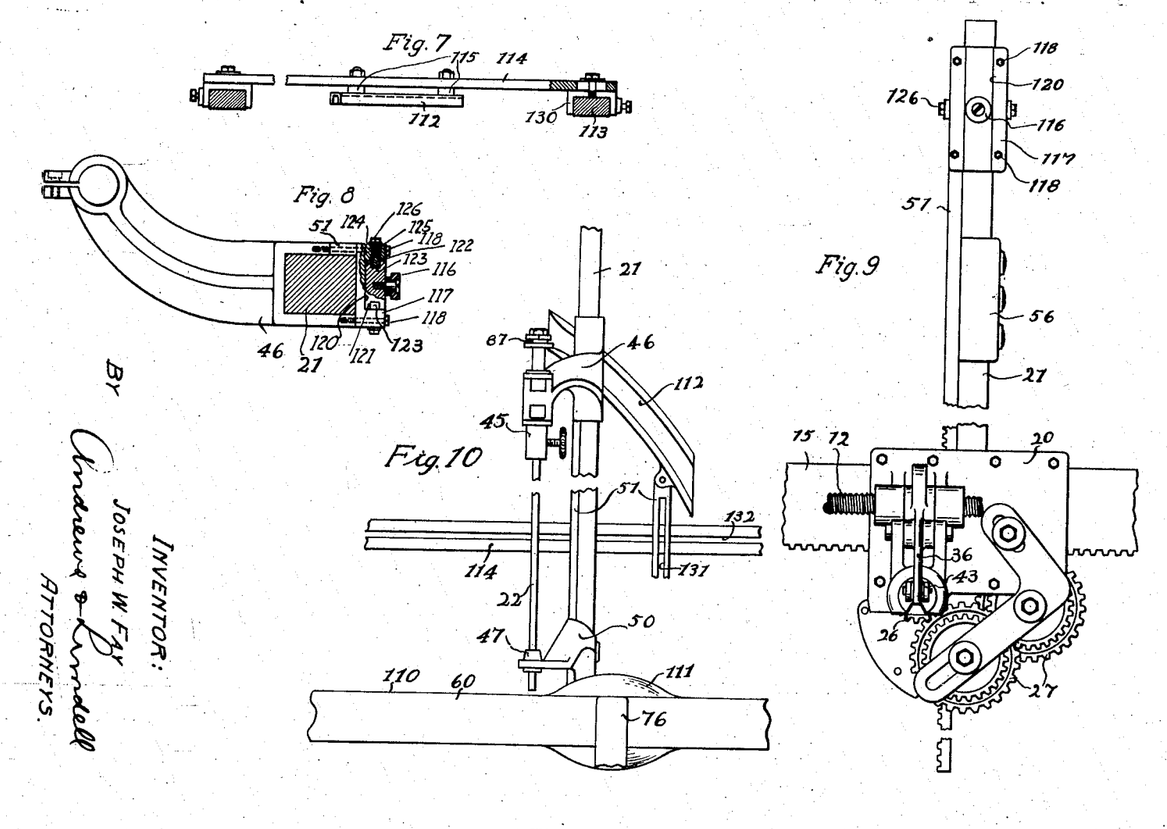
Fig. 9 is an elevation of a portion of the rear of the machine.
Fig. 10 is an elevation of a portion of the front of the machine.

The change gearing 27 referred to hereinabove and illustrated in Fig. 9 enables the operator of the machine to vary the rate of feed of the electrode with reference to the horizontal movement thereof, by changing the gearing in a well known manner. It is common in welding operations of this nature to have the vertical feed of the electrode substantially equal to the horizontal movement of the electrode, or of the work, so that the ratio between these two movements is 1; and the change gearing of the machine which I have described and illustrated in this instance is arranged to give that ratio between these movements. While it is to be understood that the ratio between these movements is not a material feature of my invention, yet it needs to be considered with reference to certain features. This ratio, however, is to be followed only in case the seam being welded is horizontal. It is obvious that whenever the seam inclines upwardly or downwardly any material amount the ratio must necessarily vary, as this ratio is such as to feed to the seam so much of the electrode material as is needed to properly form the weld. Also it is obvious that the automatic mechanism hereinabove described is not such as would operate on seams which are not in a horizontal plane. In case of a weld inclining to the horizontal it therefore becomes necessary either to operate the machine more or less manually or to have additional mechanism. The manual operation of the machine could be carried out with the mechanism described, in case of inclined seams, by suitably operating the hand wheels 23 and 54. But as this will be impossible with both electrodes, and as it is difficult to properly operate even one electrode under such circumstances, I have invented the following automatic means which are applicable to such inclined seams.

Figure 1:
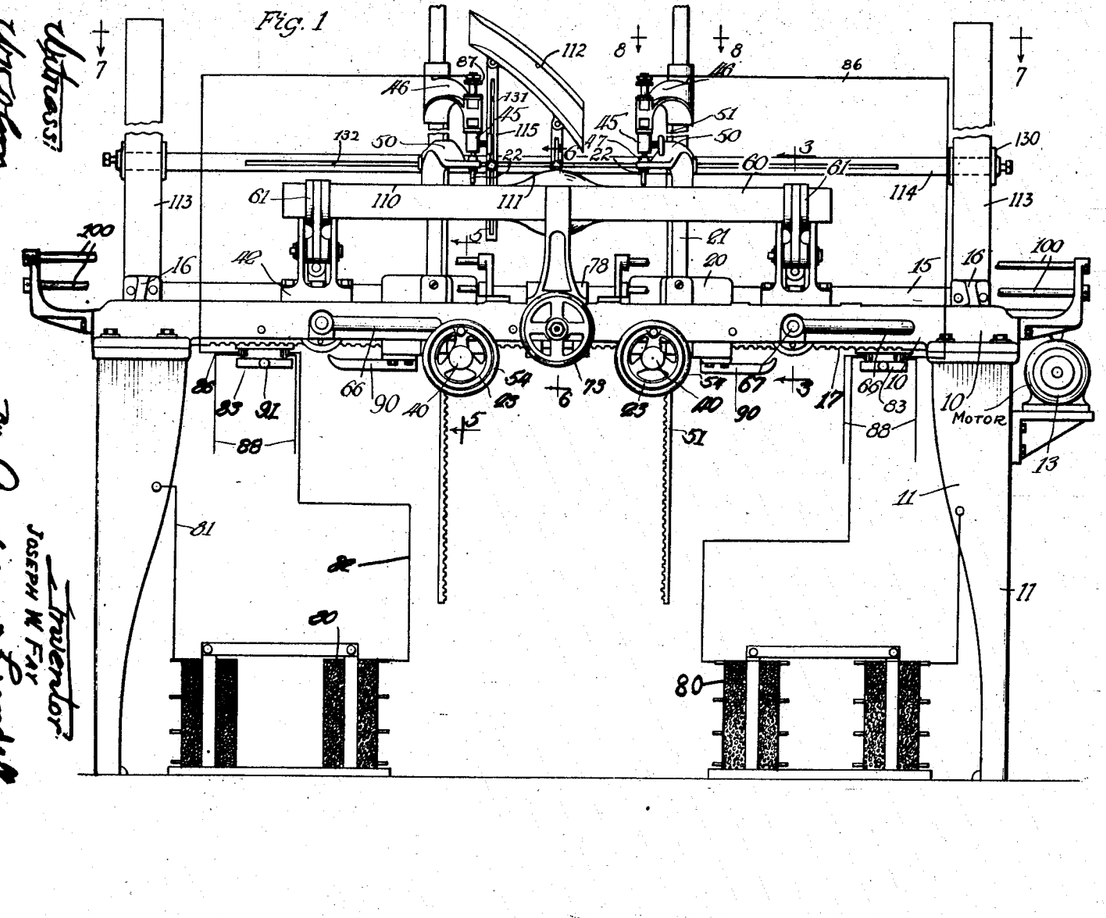
Fig. 1 is a front elevation of a welding machine which embodies the features of my invention, some portions of the machine being shown diagrammatically.
Figures 3, 4, 8:
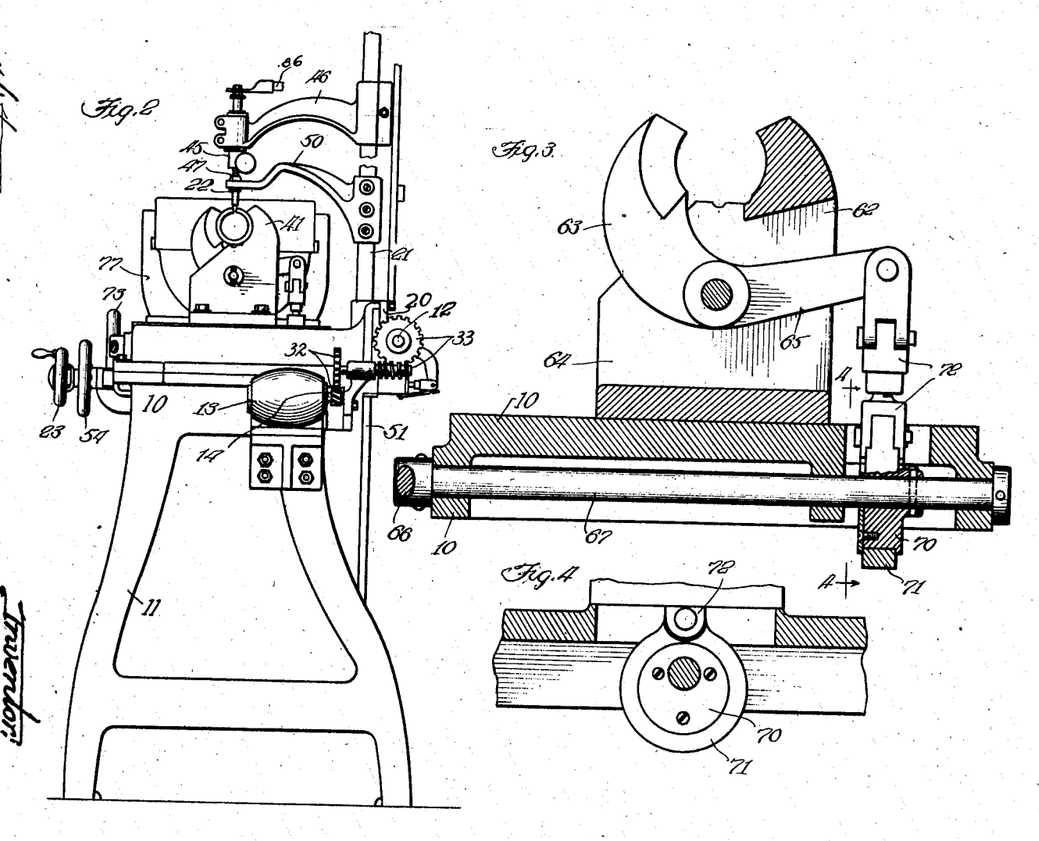
Fig. 3 is an enlarged sectional view along the line 3—3 of Fig. 1.
Fig. 4 is a sectional view along the line 4—4 of Fig. 3.
Figs. 5, 6, 7, and 8 are enlarged sectional views along the respective lines 5—5, 6—6, 7—7 and 8—8 of Fig. 1.

In case of the automatic operation of a welding machine, as hereinabove set forth, it is obvious that, as the electrode moves horizontally, the electrode clamp 45 will be lowered, and this lowering of the electrode will be at a uniform rate. The housing 60 as shown in Fig. 1, comprises the horizontal portion 110 of the seam and the non-horizontal portion 111. In welding the complete seam of the housing one of the electrodes, for definiteness we will say the right hand electrode, would be placed immediately to the left of the left portion of 111 and it would weld this portion as the electrode was moved to the right. The means which I have provided for automatically assisting in the welding of such irregular seams is arranged to take control of the elevation of the electrode as this portion of the seam is being welded. This means comprises a camway 112, arranged to coact with the electrode bracket 46 and to take control of the elevation of the bracket away from the rest of the mechanism during the welding of the irregular portion of the seam. To this end I mount in the rear of the machine uprights 113 fixed to the brackets 16, and on these uprights I mount a cross bar 114 adapted to support the cam 112 by means of links 115 which are pivoted to the cam and may be fixed to the support 114 in adjusted positions. In order to produce cooperation between the camway 112 and the bracket 46 of the electrode, I provide in the rear of the bracket a cam roller 116 (Fig. 9) which is connected by friction means to the bracket 46. The friction means comprises a casing 117 to which the bracket 46 is fixed by means of bolts 118, so that the bracket is slidably mounted on the upright 21, but is fixed to the rack 51. A groove 120 extends vertically from one end of the casing 117 to the other, and in this groove is slidably mounted a block 121 to which the cam roller 116 is pivoted. Friction pins 122 play in vertical slots 123, extending on one side of the block 121, and the pins are positioned in openings 124 in the casing 117 and are backed by springs 125 and an adjusting bolt 126. By these means the block 121 may be moved vertically in the slot 120 against the friction of the pins 122, but the pins 122 prevent horizontal movement of the block 121 in the casing 117.

As the electrode approaches the inclined portion of the seam 111, moving toward the right, the roller 116 passes into the camway 112, and this camway takes control of the elevation of the electrode away from the motor by moving the bracket 46 and the rack 51 against the friction in the disks 56. This in no way interferes with the operation of the motor, but the friction of movement of the block 121 with reference to the rack 51 is materially greater than the friction of the friction disks 56, so that the spur gear 52 is rotated by the rack 51 overcoming the friction of the disks, and the operation of the spur gear 26 is not interfered with; nor is the horizontal movement of the carriage 20 in any way affected.

Evidently in order to properly control the electrode in this manner, and to keep the lower end of the electrode at the proper distance from the welding seam, it is necessary to have the camway 112 suitably formed. But it is obvious that the formation of this camway has to do only with the elevation of the electrode clamp 45 above the seam and not with the horizontal movement of the electrode, except insofar as that movement necessarily affects the length of the electrode. The effect of the length of the electrode on the horizontal movement, in case of proper welding, is such that the amount of the electrode consumed shall be equal to the length of the seam welded, when the ratio between the vertical and horizontal movements is 1 as in this instance, and this is so without any reference to the inclination of the seam. It is evident, therefore, that in case of the welding of any seam when this ratio is 1 the lowering of the electrode support, in passing horizontally from one point to another, must equal the length of the seam between those two points, provided the points are in the same horizontal plane. Or generally the lowering of the electrode support should equal the difference between the length of the seam and the elevation of the final point above the initial point; or if the final point should be lower, it would be the algebraic difference between these two points. Hence the formation of the shape of the cam should be determined by this rule, or some equivalent rule: That is, considering any two given points in the seam, the shape of the cam should be such that in welding from one point to the other the roller should lower the electrode support an amount equal to the algebraic difference between the length of the seam welded and the elevation of the final point with reference to the initial point; and this is true entirely irrespective of the horizontal movement of the electrode.

However, it is evident that with a materially inclined seam the rate of horizontal movement, as well as vertical movement, must be varied. The horizontal movement, however, may be controlled manually, as hereinabove set forth, by pulling outwardly the button 40 and disconnecting the nut 35 from the lead screw 12 and manually controlling the horizontal movement by means of the hand wheel 23. And such manual control will in no way interfere with the proper operation of the cam control of the electrode elevation.

It is to be understood, however, that the elevation and inclination of the camway, as well as its shape, also affects the control of the electrode elevation and must be taken into consideration; so that, without changing the shape of the camway itself, more or less control of the elevation of the electrode support may be brought about by adjusting the elevation and the inclination of the camway. For this purpose I provide an adjustable clamp 130 for connecting the cross bar 114 to the uprights, and I provide slots 131 in the cam supports 115 and also slots 132 in the cross bar 114, so that the camway may be adjustably positioned horizontally and vertically, and may be inclined as much as is desired.

When the change gearing is varied so as to vary the ratio of the two movements of the electrode support, it is evident that the rule hereinabove given for determining the shape of the camway must be modified. If the ratio of the vertical movement to the horizontal movement of the electrode support is $a$ for instance, so that the vertical movement is $a$ times the horizontal, the shape and adjustment of the camway must be such as to lower the support $a$ times as much as when the ratio is 1. That is the arrangement should be such that in passing from one point to another the electrode support should be lowered $a$ times the length of the weld minus the algebraic difference in elevation of the two points.

Any suitable means may be provided for protecting the eyes of the operator from the glare of the arc lights. For such purpose I provide the rods 100, extending along the front side of the machine, and upon which may be slidably mounted any suitable means for holding suitable glass screens for the purpose. As such mechanism is no part of my present invention, I have not illustrated the same.

Although I have described with considerable detail various elements of the mechanism used in illustrating my invention, yet it is to be understood that various modifications may be made in the same by those skilled in the art without departing from the spirit of my invention as set forth in the following claims.

I claim as my invention:

1. In an electric welding machine a frame, two welding electrodes mounted for horizontal and vertical movement on said frame, and means for moving said electrodes horizontally simultaneously, and means for moving said electrodes vertically simultaneously.

2. In an electric welding machine a frame, two welding electrodes mounted for horizontal and vertical movement on said frame, and means for moving said electrodes horizontally simultaneously, and means for moving said electrodes vertically simultaneously, and additional means for moving said electrodes horizontally independently of each other.

3. In an electric welding machine a frame, two welding electrodes mounted for horizontal and vertical movement on said frame, and means for moving said electrodes horizontally simultaneously, means for moving said electrodes vertically simultaneously, and means for moving either of said electrodes vertically independently of each other.

4. In a welding machine two electrodes, automatic means for moving each of said electrodes, and manual means for moving either of said electrodes both horizontally and vertically.

5. In a welding machine two electrodes, and automatic means for moving each of said electrodes horizontally, and manual means for varying the automatic rate of movement of the electrode.

6. In a welding machine two electrodes and automatic means for moving each of said electrodes both horizontally and vertically, and manual means for varying the automatic movement of the electrodes.

7. In a welding machine a frame, a rack beam mounted on said frame, an electrode carriage slidably mounted on said beam, a gear wheel journaled in said carriage and meshing with said rack, automatic means for sliding said carriage, and manual means for rotating said wheel.

8. In a welding machine a frame, a rack beam mounted on said frame, a carriage slidably mounted on said beam, a gear wheel journaled in said carriage and meshing with said rack, a second rack mounted for vertical movement in said carriage, a gear wheel journaled in said carriage and meshing with said second rack, and means for rotating both of said gears simultaneously, said means comprising friction means connecting said two gears.

9. In a welding machine a frame, a rack beam mounted on said frame, a carriage slidably mounted on said beam, a gear wheel journaled in said carriage, and meshing with said rack, a second rack mounted for vertical movement in said carriage, a gear wheel journaled in said carriage and meshing with said second rack, automatic means for rotating both of said gears simultaneously, said means comprising friction means connecting said two gears, and manual means for varying the relative rate of rotation of said wheels.

10. In a welding machine a frame, an electrode mounted on said frame for vertical and horizontal movement, means for producing horizontal movement of said electrode, and other means operated by said first mentioned means for producing vertical movement of said electrode, said other means comprising a friction drive.

11. In a welding machine a frame, an electrode mounted on said frame for vertical and horizontal movement, means for producing horizontal movement of said electrode, and other means operated by said first mentioned means for producing vertical movement of said electrode, said other means comprising a friction drive, and means for overcoming said friction drive.

12. In a seam welding machine, two welding electrodes, automatic means for moving said electrodes parallel with the seam being welded and vertically, and automatic means for stopping the movement of said electrodes.

13. In a welding machine, work clamping means comprising a fixed jaw, a pivoted jaw, a shaft rotatably mounted in said machine, operating means fixed to said shaft, an eccentric fixed to said shaft, and operating means connecting said eccentric and said pivoted jaw.

14. In a welding machine, a frame, work clamping means comprising two jaws mounted for transverse movement on said frame, a shaft rotatably mounted transversely of said frame, a right and a left hand thread on said shaft, a lug fixed to each of said jaws, one of said lugs having a right hand thread meshing with the right hand thread on said shaft, the other of said lugs having a left hand thread meshing with the left hand thread of said shaft, and operating means for rotating said shaft.

15. In a welding machine, two electrodes movably mounted on said machine, means for holding an article to be welded, and means mounted on the front side of said machine for manually moving each of said electrodes and for operating said holding means.

16. In a welding machine, a support, two electrodes, each of said electrodes being mounted on said support for horizontal and for vertical movement, a plurality of work clamping means, manual means mounted in front of said support for imparting horizontal and vertical movement to the other electrode, and other means mounted in front of said support for operating independently said clamping means.

17. In a welding machine, a support, two electrodes, each of said electrodes being mounted on said support for horizontal and for vertical movement, a plurality of work clamping means, manual means mounted in front of said support for independently imparting horizontal and vertical movement to one of said electrodes, other means mounted in front of said support for independently imparting horizontal and vertical movement to the other electrode, and other means mounted in front of said support for operating independently said clamping means, said electrode moving means arranged to move horizontally with the respective electrodes.

18. In an electric arc seam welding system, two welding electrodes, and means for keeping the arc end of one of said electrodes in a substantially horizontal plane as said electrode is being consumed, and means for automatically varying the elevation of the arc end of the other electrode as it is being consumed.

19. In an electric arc seam welding system, two welding electrodes, and means for keeping the arc end of one of said electrodes in a substantially horizontal plane as said electrode is being consumed, and means for automatically varying the elevation of the arc end of the other electrode as it is being consumed, but in maintaining uniform the distance between the arc end of the latter electrode and the seam which it is welding.

20. In a welding machine a vertically supported welding electrode, means for moving said electrode horizontally, and automatic means for moving said electrode vertically as it is being consumed so as to vary the elevation of the arc end thereof, and manual means for taking the control of the elevation of said arc end away from the automatic means, during the welding process.

21. A welding machine comprising a welding electrode, means for moving said electrode transversely of its length, automatic means for moving said electrode longitudinally of its length, other automatic means for taking the control of said longitudinal movement away from the first mentioned automatic means, and manual means for taking the control of said longitudinal movement away from either of said automatic means during the welding process.

22. In a welding machine, a welding electrode, automatic means for imparting to said electrode uniform movement longitudinally of its length, automatic means for varying said movement, each of said means comprising friction driving means, and manual means for varying said movement during the welding process.

23. In a welding machine, a welding electrode, automatic means for imparting to said electrode uniform movement longitudinally of its length, automatic means for varying said movement, each of said means comprising friction driving means, and manual means for varying said movement during the welding process, the friction of the last mentioned friction means being greater than the friction of the first mentioned friction means, whereby the driving means for varying the movement can overcome the driving means for maintaining the movement uniform.

24. In a welding machine, a welding electrode, automatic means for imparting to said electrode uniform movement longitudinally of its length, and automatic means for varying said movement, each of said means comprising friction driving means, and positive manual driving means for varying said movement, whereby by the use of said manual means either of the friction driving means can be overcome, and the control of the movement can be taken away from both of the automatic means.

25. In a machine for welding seams, a support, an electrode supported by said support, means for holding an article having a seam or a joint to be welded, and automatic means for moving said support uniformly in a straight line inclined to said seam when welding a straight portion of said seam, but for changing the direction of said motion when the seam varies from a straight line.

26. In an arc welding machine, a metal electrode, a support for said electrode, means for holding a joint to be welded, and means for moving said support transversely towards and longitudinally of said joint, in the ratio of the rate of said movement being uniform when the portion of said joint which is being welded is straight, but when the portion being welded is not straight between any two points the transverse movement between said points being equal to the product of the said ratio and the algebraic sum of the length of the joint between the points and distance between the planes of the points which are perpendicular to said transverse movement.

27. In an arc joint welding machine a support, a metal electrode vertically mounted on said support, means for holding a joint to be welded and means for moving said support vertically and also horizontally, the ratio of the rate of said movements being uniform when the portion of the joint being welded is horizontal, but when the joint between any two points is not horizontal, the transverse movement between said points being equal to the product of said uniform ratio and the algebraic sum of the length of the joint between the points and the difference in elevation of the two points.

28. In an electric arc welding machine, an electrode support a metal electrode mounted on said support, means for holding a joint to be welded, and means for moving said support towards and also longitudinally of said joints, said movement being at equal rates when the portion of the joint being welded is straight, but when the portion being welded is not straight between any two points the total movement of the support towards the joint between the points being equal to the length of the joint between the points minus the distance between the planes of the points which are perpendicular to the latter movement.

29. In an arc joint welding machine, a support, a metal electrode vertically mounted on said support, means for holding a joint to be welded, and means for moving said support vertically and also horizontally, the ratio of the rate of said movement being uniform when the portion of the joint being welded is horizontal, but when the joint between any two points is not horizontal, the transverse movement between said points being equal to the product of said uniform ratio and the algebraic sum of the length of the joint between the points and the difference in elevation of the two points, and means for varying said ratio.

30. A welding machine comprising a frame, a horizontal lead screw rotatably mounted on said frame, means for rotating said screw, a carriage slidably mounted on said frame, a nut fixed to said carriage and arranged to mesh with said screw, an electrode support mounted for vertical movement on said carriage, and means actuated by said carriage for operating said support.

31. A welding machine comprising a frame, a horizonal lead screw rotatably mounted on said frame, means for rotating said screw, a carriage slidably mounted on said frame, a nut fixed to said carriage and arranged to mesh with said screw, an electrode support mounted for vertical movement on said carriage, means actuated by said carriage for operating said support, said latter means comprising a friction connection, and manual means for operating said support.

32. A welding machine comprising a frame, a horizontal lead screw rotatably mounted on said frame, means for rotating said screw, a carriage slidably mounted on said frame, a nut fixed to said carriage and arranged to mesh with said screw, an electrode support mounted for vertical movement on said carriage, means actuated by said carriage for operating said support, and means for throwing said nut in and out of mesh with said screw, and manual means for sliding said carriage.

33. A welding machine comprising a frame, a horizontal lead screw rotatably mounted on said frame, means for rotating said screw, a carriage slidably mounted on said frame, a nut fixed to said carriage and arranged to mesh with said screw, an electrode support mounted for vertical movement on said carriage, and means actuated by said carriage for operating said support, said means for operating said support comprising speed changing mechanism.

34. A welding machine comprising a frame, a carriage slidably mounted on said frame, means for sliding said carriage, a rack fixed to said frame and parallel with the path of motion of said carriage, a gear wheel rotatably mounted on said carriage and meshing with said rack, an electrode support mounted on said carriage for vertical movement, and means for actuating said support operated by said wheel, said latter means comprising a friction connection, and manual means for operating said support.

In testimony whereof, I hereunto set my hand.

JOSEPH W. FAY.